(12) United States Patent
Zievers

(10) Patent No.: US 9,055,069 B2
(45) Date of Patent: *Jun. 9, 2015

(54) HARDWARE COMPUTING SYSTEM WITH SOFTWARE MEDIATION AND METHOD OF OPERATION THEREOF

(71) Applicant: Xcelemor, Inc., Danville, CA (US)

(72) Inventor: Peter J. Zievers, Naperville, IL (US)

(73) Assignee: Xcelemor, Inc., Livermore, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/764,154

(22) Filed: Feb. 11, 2013

(65) Prior Publication Data

US 2013/0160031 A1 Jun. 20, 2013

Related U.S. Application Data

(60) Provisional application No. 61/612,882, filed on Mar. 19, 2012.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *H04L 29/08* | (2006.01) |
| *G06F 9/54* | (2006.01) |

(52) U.S. Cl.
CPC ........ *H04L 67/10* (2013.01); *G06F 9/46* (2013.01); *G06F 9/54* (2013.01); *G06F 9/545* (2013.01)

(58) Field of Classification Search
None
See application file for complete search history.

(56) References Cited

U.S. PATENT DOCUMENTS

| 5,555,201 | A | 9/1996 | Dangelo et al. | |
|---|---|---|---|---|
| 6,628,653 | B1 * | 9/2003 | Salim | 370/389 |
| 7,823,131 | B2 | 10/2010 | Gard et al. | |
| 7,991,909 | B1 * | 8/2011 | Schumacher et al. | 709/237 |
| 2003/0212940 | A1 | 11/2003 | Wong | |
| 2004/0148420 | A1 | 7/2004 | Hinshaw et al. | |
| 2006/0037008 | A1 * | 2/2006 | Stelzer et al. | 717/136 |
| 2006/0285733 | A1 * | 12/2006 | Demharter | 382/128 |
| 2009/0089752 | A1 | 4/2009 | Tristram | |
| 2010/0005741 | A1 | 1/2010 | ***Tripp | |
| 2011/0264815 | A1 * | 10/2011 | Fascenda | 709/229 |
| 2012/0266171 | A1 | 10/2012 | Byun et al. | |
| 2012/0266179 | A1 | 10/2012 | Osborn et al. | |
| 2013/0179486 | A1 * | 7/2013 | Lee et al. | 709/201 |

OTHER PUBLICATIONS

Wang, "An Automated Flow to Generate Hardware Computing Nodes fr C for an FPGA-Based MPI Computing Network", "Division of Engineering Science-Faculty of Applied Science and Engineering", Apr. 2008, pp. 58, Publisher: University of Toronto, Published in: CA.

International Search Report for PCT Application No. PCT/US2013/032866 dated Jun. 3, 2013.

* cited by examiner

*Primary Examiner* — Craig Dorais
(74) *Attorney, Agent, or Firm* — Ishimaru & Associates LLP

(57) ABSTRACT

A method of operation of a hardware computing system includes: generating a command stream by a general purpose central processing unit; and receiving, by an application manager, the command stream for executing a command by a programmable execution engine and providing a status through a command execution interface to the general purpose central processing unit for the command from the command stream.

20 Claims, 6 Drawing Sheets

HARDWARE COMPUTING SYSTEM WITH SOFTWARE MEDIATION AND METHOD OF OPERATION THEREOF

CROSS-REFERENCE TO RELATED APPLICATION(S)

This application claims the benefit of U.S. Provisional Patent Application Ser. No. 61/612,882 filed Mar. 19, 2012, and the subject matter thereof is incorporated herein by reference in its entirety.

TECHNICAL FIELD

The present invention relates generally to a hardware computing system, and more particularly to a system for accelerating application execution.

BACKGROUND ART

Operating systems in computers enable the computers to communicate with external resources for execution of commands related to an application. The operating system typically handles direct control of items associated with computer usage including keyboard, display, disk storage, network facilities, printers, modems, etc. The operating system in a computer is typically designed to cause a general purpose central processing unit ("CPU") to perform tasks including the managing of local and network file systems, memory, peripheral device drivers, and processes including application processes.

Placing responsibility for all of these functions on the CPU imposes significant processing burdens on it, particularly when the operating system is sophisticated, as, for example, in the case of Windows NT™, Unix™, and NetWare™. The more the burden is placed on the CPU to run processes other than those associated with applications, the less CPU time is available to run applications with the result that performance of the applications may be degraded.

In addition, the throughput of devices external to the CPU is subject to the limitations imposed by the CPU when the operating system places responsibility for managing these devices on the CPU. Furthermore, reliability of the overall software-hardware system, including the CPU, running the operating system, in association with the devices, will depend, among other things, on the operating system. Owing to the inherent complexity of the operating system, unforeseen conditions may arise which may undermine stability of the overall software-hardware system.

Thus, a need still remains for a hardware computing system with software mediation. In view of the performance and power limitations imposed on general purpose central processing units, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a hardware computing system including: generating a command stream by a general purpose central processing unit; and receiving, by an application manager, the command stream for executing a command by a programmable execution engine and providing a status through a command execution interface to the general purpose central processing unit for the command from the command stream.

The present invention provides a hardware computing system including: a memory device having a software application loaded therein; a general purpose central processing unit coupled to the memory device for generating a command stream by reading a command of the software application; and an application manager, having a programmable execution engine, coupled to the memory device and the general purpose central processing unit includes the programmable execution engine executes the command and a command execution interface provides status to the general purpose central processing unit for the command from the command stream.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
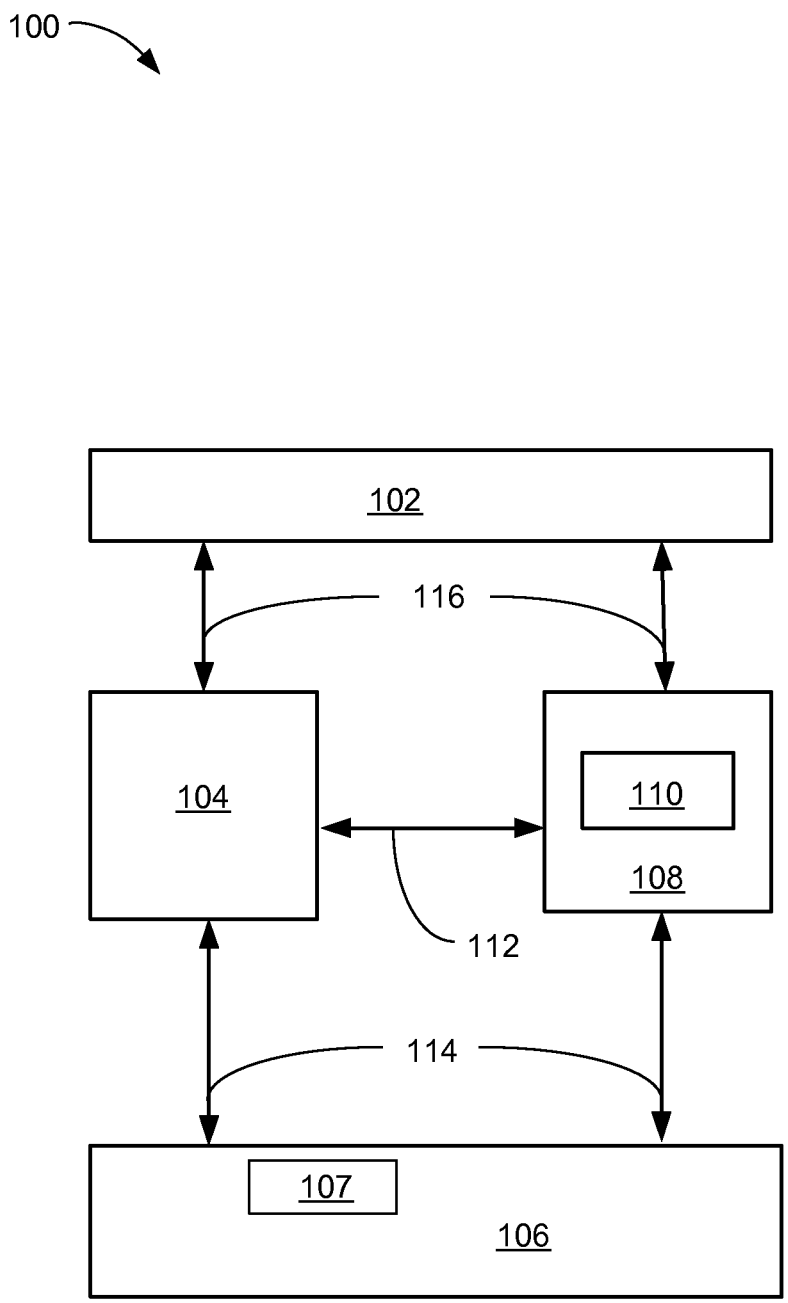
FIG. 1 is a block diagram of a hardware computing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "application" refers herein to a sequence of software commands grouped in order to complete a desired process. The term "processing" as used herein includes decoding of software commands, loading of registers, accessing peripherals, and/or accessing memory in executing an application.

The term "software application" refers herein to a machine language program, compiled to operate in the general purpose central processing unit, comprising a list of executable commands that are recognized by the general purpose central processing unit.

The term "execute" refers herein to perform a mathematical operation, a logical operation, storage access operation, or a combination thereof, as required by a command of the software application.

Referring now to FIG. 1, therein is shown a block diagram of a hardware computing system 100 in an embodiment of the present invention. The block diagram of a hardware computing system 100 depicts a peripheral controller 102, can be an integrated circuit for communicating with peripheral devices such as disk drives, tape drives, communication devices, printers, scanners, or the like, coupled to a general purpose central processing unit 104. The term "general purpose central processing unit" refers herein to any micro-processor or processor group that is intended to execute software instructions for operation of a software application. A memory device 106 can be coupled to the general purpose central processing unit 104 for storing operation results and retrieving instructions or operation input data required by a software application 107. The memory device 106 can include registers, dynamic random access memory (DRAM), static random access memory (SRAM), non-volatile random access memory (NVRAM), or the like. It is understood that the software application 107 can enter the hardware computing system 100 from the memory device 106 or the peripheral controller 102. It is also understood that the software application 107 can be transferred from the peripheral controller 102 to the memory device 106 at an initiation of the software application 107.

An application manager 108 can be coupled to each of the peripheral controller 102, the general purpose central processing unit 104, and the memory device 106. The application manager 108 can configure a programmable execution engine 110 in order to select which of the configured commands can be executed by the programmable execution engine 110. The application manager 108 can maintain a command configuration table that can be used to supplement or replace commands configured in the programmable execution engine 110.

It is understood that any application commands or command strings for the programmable execution engine 110 can be configured by a system developer (not shown) to include an array of commands that can be executed in the programmable execution engine 110 rather than by the software application 107. The programmable execution engine 110 can execute the commands for the software application 107 one to two orders of magnitude faster than is possible with the general purpose central processing unit 104. The performance benefit provided by the application manager 108 can be customized to support specific commands or applications in order to provide the optimum performance benefit when the application manager 108 is invoked.

The application manager 108 can receive a command call from the software application 107 and activate the programmable execution engine 110 when the programmable execution engine 110 is configured to support the current command call. The application manager 108 maintains a list of commands that can be supported by the current configuration of the programmable execution engine 110. If the programmable execution engine 110 can execute the command required by the software application 107, the software application 107 can pause the general purpose central processing unit 104 in order to allow the operation of the command by the programmable execution engine 110.

The application manager 108 can reconfigure the programmable execution engine 110 if a different command must be implemented for execution of the command call. The application manager 108 can provide a status, through a command execution interface 112, in order to allow the software application 107 to activate a fixed delay or sleep function in the general purpose central processing unit 104. The general purpose central processing unit 104 will resume execution after the delay. The programmable execution engine 110 can be reconfigured and execute the command call provided by the software application 107 during the delay of the general purpose central processing unit 104.

While the command execution interface 112 is shown as a direct connection between the general purpose central processing unit 104 and the application manager 108, it is understood that the command execution interface 112 can be implemented as a bus status, serial communication packet, exception indicator, an interrupt, or status exchange sequence. The command execution interface 112 is intended to allow communication between the application manager 108 and the software application 107 executing on the general purpose central processing unit 104. The application manager 108 can access the command execution interface 112 in order to pause or bypass the execution of the command call by the general purpose central processing unit 104. If the application manager 108 is able to execute the command, it can retrieve the command parameters through a memory bus 114. The application manager 108 and the programmable execution engine 110 can be paused between the command calls in the flow of the software application 107. It is understood that while the memory bus 114 is shown as two busses, the memory bus 114 can be a single bus having the general purpose central processing unit 104 and the application manager 108 as balanced connections. The programmable execution engine 110 can store the results of the execution of the command in the memory device 106 upon completion of a command call from the software application 107.

If the command execution interface 112 is set to indicate the application manager 108 will execute the command, the general purpose central processing unit 104 will skip the command and wait for the application manager 108 to complete the execution of the command call. It is understood that in most cases the application manager 108 can complete the execution of the command before the general purpose central processing unit 104 can detect the command and the application manager 108 can complete a number of the commands before the general purpose central processing unit 104 is ready for its next command.

When the application manager 108 determines that the programmable execution engine 110 is not configured to execute the command required by the software application 107, the application manager 108 can communicate through the command execution interface 112 to the software application 107 which can enable the general purpose central processing unit 104 to execute the command call through software execution. This hardware execution of the commands by the application manager 108 can be adjusted by re-configuring the programmable execution engine 110. The execution time of the hardware computing system 100 can be accelerated by providing more commands, that can be accommodated by the application manager 108, than will fit within the programmable execution engine 110.

A peripheral control bus 116 provides a communication path to the storage and communication devices coupled to the peripheral controller 102. The application manager 108 can utilize the peripheral controller 102 to complete command operations that require file transfers to any attached peripheral devices.

Figure 2:
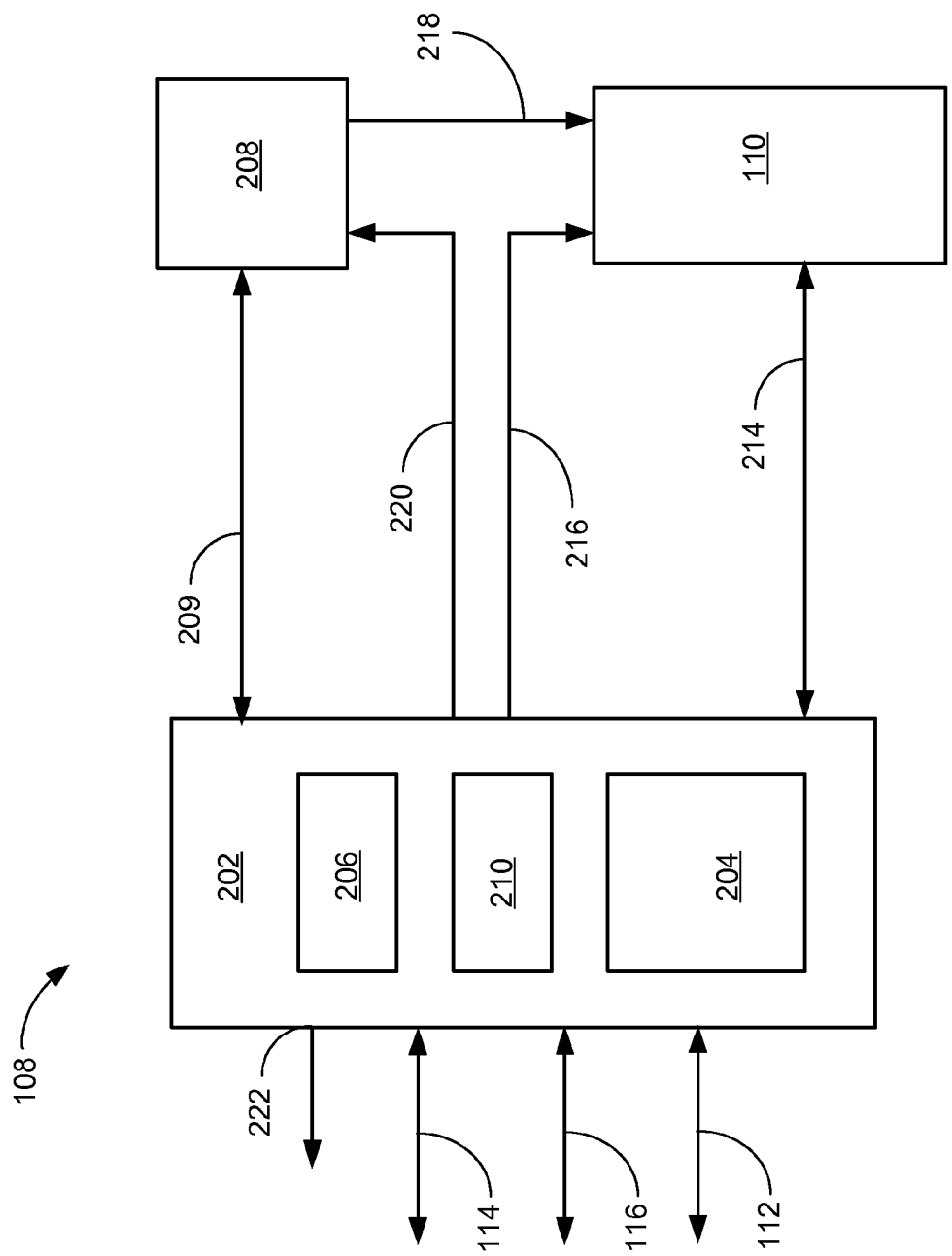
FIG. 2 is a block diagram of the application manager of FIG. 1.

Referring now to FIG. 2, therein is shown a block diagram of the application manager 108 of FIG. 1. The block diagram of the application manager 108 depicts a command processor assembly 202, which can be implemented in a complex programmable logic device (CPLD). The command processor assembly 202 can include a command processor 204 that receives a command stream through an embedded memory controller 206. The command processor 204 can determine if the command can be executed without the assistance of the general purpose central processing unit 104 of FIG. 1.

The command processor 204 can access the embedded memory controller 206, coupled to a configuration memory 208, through an embedded memory bus 209 in order determine whether the command can be executed by the application manager 108. The configuration memory can be any writeable memory such as a random access memory (RAM) or flash memory. The configuration memory 208 can be written by the embedded memory controller 206 to hold the circuit configurations that can be loaded into the programmable execution engine 110, such as a field programmable gate array (FPGA). The command processor 204 can maintain the current configuration of the programmable execution engine 110 and if necessary, can alter the configuration by accessing a field programmable gate array (FPGA) interface module 210. The programmable execution engine 110 can be coupled to the FPGA interface module 210, which maintains the configuration and percent utilization of the programmable execution engine 110.

The command processor 204 can initially determine whether the programmable execution engine 110 is currently configured to execute the command that is presented on the memory bus 114 by accessing the configuration memory 208 through the embedded memory controller 206. If it is determined that the programmable execution engine 110 is not appropriately configured to execute the command, the command processor 204 can update the current state and configuration of the programmable execution engine 110 through the FPGA interface module 210. It is understood that the number of configuration images that are maintained in the configuration memory 208 can represent more logic than is able to be loaded in the programmable execution engine 110 at one time. By monitoring the usage statistics of the configuration images, the command processor 204 can manage the loading of the configuration images to the programmable execution engine 110 in order to increase the percentage of utilization of the application manager 108.

When the command processor 204 determines that the command can be executed by the configuration within the programmable execution engine 110, the command processor 204 can take control of the command by activating a status in the command execution interface 112. The command processor 204 can then retrieve the command parameters and transfer the command parameters through a command traffic bus 214. The command processor 204 activates the FPGA interface module 210 to manage an FPGA control bus 216 during the command parameter transfer and any reconfiguration processes.

In order to reconfigure the programmable execution engine 110, the command processor 204 can manipulate the configuration through the FPGA interface module 210 and the embedded memory controller 206. The embedded memory controller 206 can address the configuration memory 208 in order to provide configuration patterns on a configuration bus 218. The embedded memory controller 206 can drive a memory control bus 220, coupled to the embedded memory 208, to provide address and control lines for selecting the configuration patterns that are provided to the programmable execution engine 110.

The command processor 204 can detect any conditions that can cause erroneous operations, such as the configuration time-out, image loading error, check sum error, or the like. If a failure condition is detected by the command processor 204, the embedded memory controller 206, the FPGA interface module 210, or a combination thereof, the command processor assembly 202 can activate a command process error driver 222. The activation of the command process error driver 222 can cause the general purpose central processing unit 104 to execute the command that was pending during the command set-up by the command processor assembly 202 and detection of the failure condition. The command processor assembly 202 can be coupled to the peripheral control bus 116 for accessing storage and communication devices managed by the peripheral controller 102 of FIG. 1.

It has been discovered that the configuration memory 208 can be programmed with configuration images for the programmable execution engine 110 that can be targeted to support a specific set of the software application 107 of FIG. 1 or to support specific sets of commands that are inefficient when executed by the general purpose central processing unit 104. The performance of the hardware computing system 100 of FIG. 1 can be measured to be greater than twice that of the general purpose central processing unit 104 alone. It is understood that the logical connections within the command processor assembly 202 are not shown for clarity and brevity.

Figure 3:
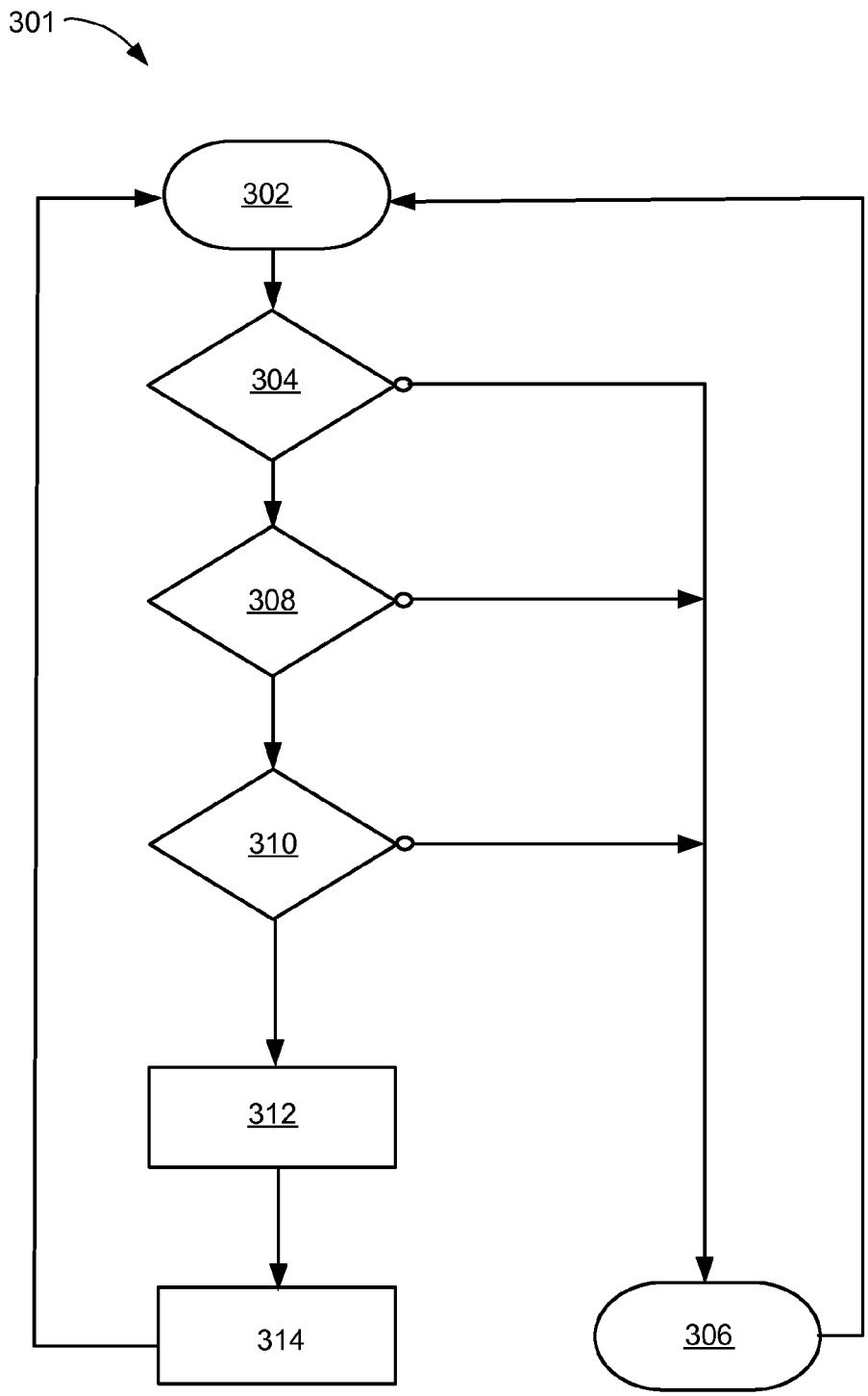
FIG. 3 is a flow chart of the operation of the application manager of FIG. 1.

Referring now to FIG. 3, therein is shown a flow chart 301 of the operation of the application manager 108 of FIG. 1. The flow chart 301 of the operation of the application manager 108 includes a receive command module 302, in which the command processor 204 of FIG. 2 can store a session number as required by the embedded memory controller 206 of FIG. 2, which determines the logic requirement for the programmable execution engine 110 of FIG. 2 in order to support the current session, and initializes session statistics of which of the available logic images is used in the programmable execution engine 110. The receive command module 302 can include capturing a command by monitoring the command bus of the general purpose central processing unit, receiving an application call through a register set or shared memory, or receiving a command packet transfer through the application manager 108 of FIG. 1. The flow chart 301 then proceeds to a verify FPGA image module 304.

The verify FPGA image module 304 can determine whether the current image loaded in the programmable execution engine 110 will support the command execution that corresponds to the session number stored by the command processor 204. It is understood that the verify FPGA image module 304 can detect a configuration time-out, image loading error, check sum error, or the like in order to determine that the currently loaded image in the programmable execution engine 110 may not support the requirement of the current session. If the verify FPGA image module 304 determines the currently loaded image in the programmable execution engine 110 will not support the requirement of the current session, the flow proceeds to a software execution module 306.

The software execution module 306 can update the session number of the programmable execution engine 110 logic image, the programmable execution engine 110 is loaded with a logic image based on the command, and the command processor 204 releases the command execution interface 112 of FIG. 1 and allows the general purpose central processing unit 104 of FIG. 1 to execute software to complete the command execution. The usage statistics, used to determine which of the logic image will be loaded in the programmable execution engine 110, can be analyzed by a number of algorithms including but not limited to a least most recently used (LMRU), least frequently used (LFU), next most recently used (NMRU), or the like. It is understood that the decision to execute the command by the application manager 108 of FIG. 1 or by the general purpose central processing unit 104 can occur before any delay in the command execution is incurred. Upon the initiation of execution of the current command, the flow returns to the receive command module 302 in order to process the next command.

If the verify FPGA image module 304 determines the currently loaded image in the programmable execution engine 110 will support the requirement of the current session, the flow proceeds to a verify required image module 308. The verify required image module 308 can determine whether the application manager 108 has the required configuration to support the command. This is performed by reading the current configuration from the configuration memory 208 of FIG. 2. If the verify required image module 308 determines that the required configuration to support the command is not loaded in the programmable execution engine 110, but is in the configuration memory 208, the programmable execution engine 110 can be updated to include the required function. In the case the programmable execution engine 110 must be updated, the command execution interface 112 can cause the general purpose central processing unit 104 to enter a sleep state in order to allow the update to occur. During the update process the detection of the configuration time-out, image loading error, check sum error, or the like, can cause the flow to proceed to the software execution module 306 which allows the command execution by software executed by the general purpose central processing unit 104.

If on the other hand the verify required image module 308 determines the application manager 108 has the required configuration loaded to support the command, the flow proceeds to a check for FPGA available module 310. The check for busy module 310 can determine whether the programmable execution engine 110 is busy by the command processor 204 interrogating the FPGA interface module 210 of FIG. 2. The FPGA interface module 210 can provide an indication of command execution within the programmable execution engine 110. If the check for FPGA available module 310 determines that the programmable execution engine 110 is busy, the flow proceeds to the software execution module 306 and allows the command execution by software executed by the general purpose central processing unit 104.

If the check for FPGA available module 310 determines that the programmable execution engine 110 is not busy, the flow proceeds to an execute command module 312. In the execute command module 312, the command processor 204 can retrieve the input data from the memory bus 114 of FIG. 1. The input data is provided to the FPGA interface module 210 for transfer to the appropriate input registers of the programmable execution engine 110. Upon completion of the command execution by the programmable execution engine 110, the command processor 204 can respond through the command execution interface 112 in order to step to the next command in the software application 107 of FIG. 1. The flow then proceeds to an update statistics module 314.

The update statistics module 314 can transfer completion status indicating the resolution of the command executed by the programmable execution engine 110. The command processor 204 can increment the program counter in order to retrieve the next command and the flow then returns to the receive command module 302 in order to process the next command.

It has been discovered that the usage statistics as generated by the command processor 204 can improve the frequency of configuration matches between the command sequence and the configuration of the programmable execution engine 110. As the application manager 108 can increase its execution percentage, the performance of the hardware computing system 100 of FIG. 1 can be increased between 10 and 100 times the performance of the general purpose central processing unit 104 on its own.

Figure 4:
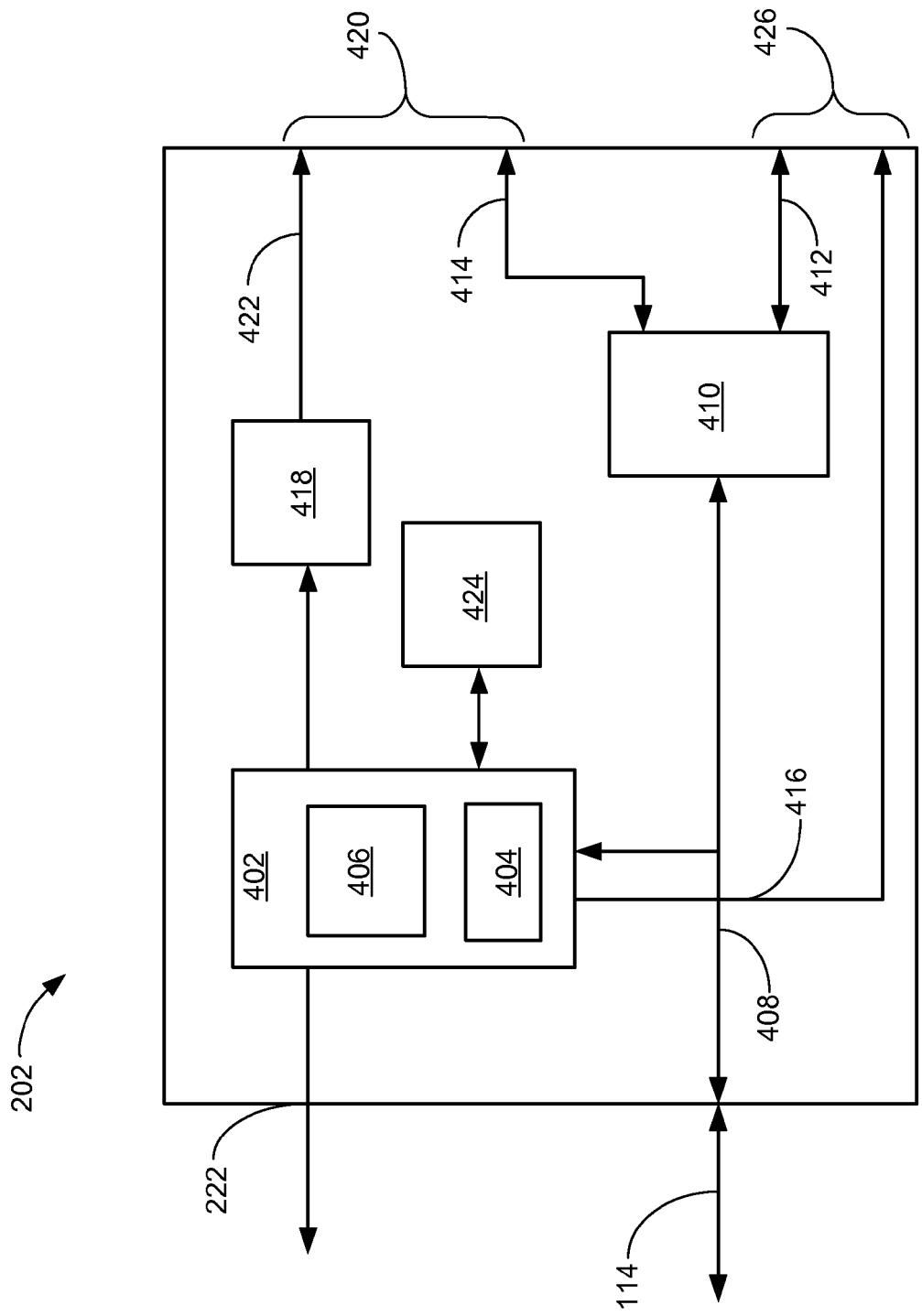
FIG. 4 is a detailed block diagram of the command processor assembly of FIG. 2.

Referring now to FIG. 4, therein is shown a detailed block diagram of the command processor assembly 202 of FIG. 2. The detailed block diagram of the command processor assembly 202 depicts a command interpreter 402 having an FPGA control module 404 and a command processing unit 406. A command stream 408, can be sourced from the memory bus 114, is coupled to the command interpreter 402 and a bi-directional selector 410. The bi-directional selector 410 can diverge the command stream 408 into an FPGA data stream 412 and a memory data stream 414.

The FPGA data stream 412 can provide configuration image data as well as the command input data required to execute a configured command. An FPGA program control bus 416 can be sourced from the command interpreter 402 and can be managed by the FPGA control manager 404.

The memory data stream 414 can provide FPGA configuration data options to be stored in the memory device 208 of FIG. 2. The memory data stream 414 can also be used to retrieve the FPGA configuration data used to re-configure the programmable execution engine 110 of FIG. 2.

A memory control function 418 can be coupled to the command interpreter 402 for managing a memory interface 420. The memory control function 418 can source the memory control bus 422, which in coordination with the memory data stream 414 forms the memory interface 420. An embedded table memory 424 can be coupled to the command interpreter 402 for maintaining current configuration data and statistical usage data.

An FPGA interface 426 includes the FPGA data stream 412 and the FPGA program control bus 416. The coordination of the FPGA data stream 412 and the FPGA program control bus 416 is under control of the FPGA control module 404. The command interpreter 402 can monitor the integrity of the transfers between the command data stream 408 and the FPGA interface 426 or the memory interface 420. If the command interpreter 402 detects an error in the transfers the command process error driver 222 will be asserted.

It is understood that the implementation details provided are a possible implementation of the present invention. It is further understood that other implementations may be possible and are included by the description in this specification.

Figure 5:
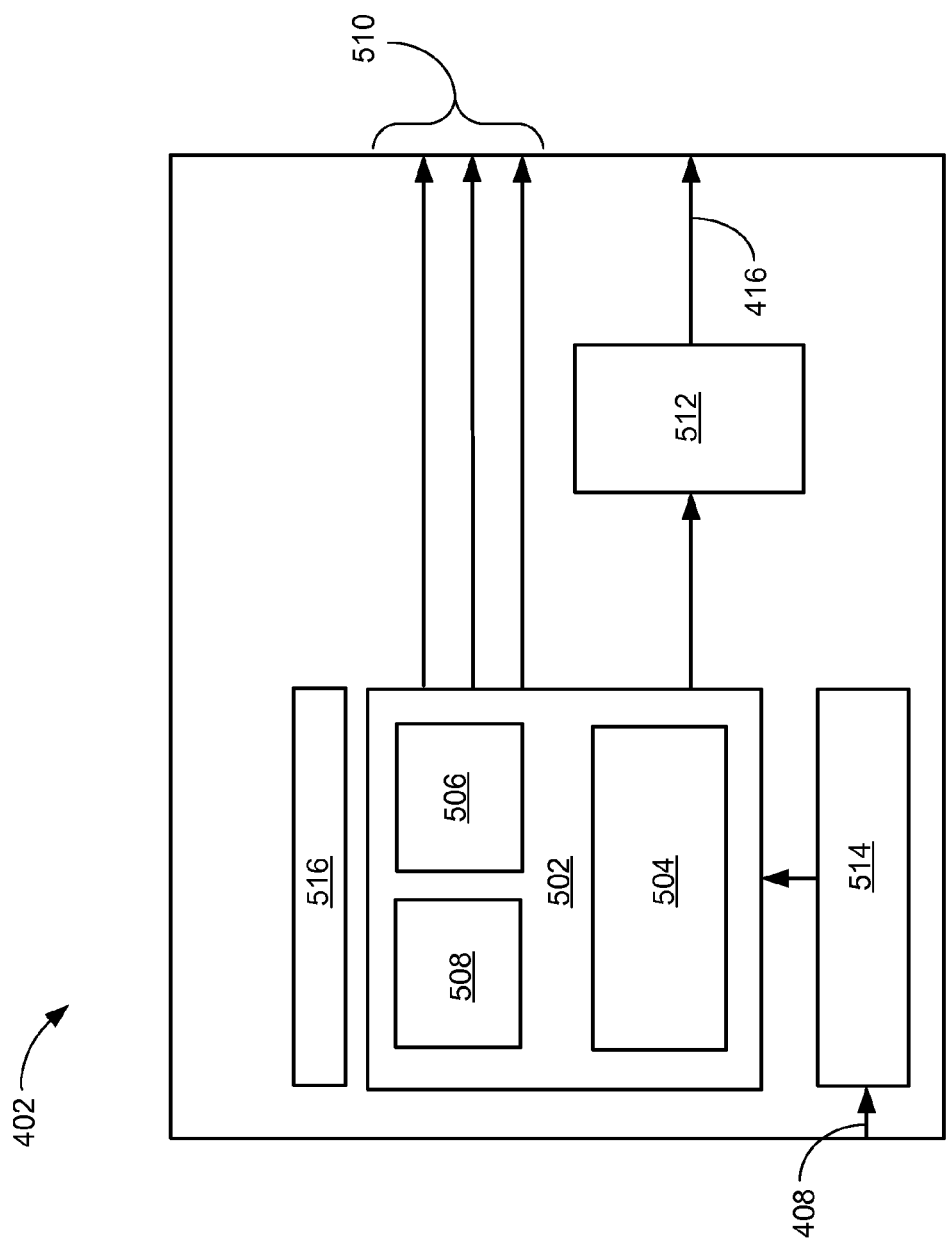
FIG. 5 is a detailed block diagram of the command interpreter of FIG. 4.

Referring now to FIG. 5, therein is shown a detailed block diagram of the command interpreter 402 of FIG. 4. The detailed block diagram of the command interpreter 402 depicts a command control module 502 having an FPGA interface controller 504. The FPGA interface controller 504 can include state machines and check logic that provides full integrity during the loading of characterization images and the command input and results.

The command control module 502 also has a table memory controller 506 and an application command decoder logic 508. The table memory controller 506 can source a memory interface bus 510 that provides enable, address, and read/write control to the memory control function 418 of FIG. 4.

An FPGA parallel loader 512 is managed by the FPGA interface controller 504. The FPGA parallel loader 512 can provide the FPGA program control bus 416 while also performing error checking and timing control.

The application command decoder logic 508 can receive the output of a framer 514 that processes the command stream 408. The command control module 502 can verify the rate and alignment of the framer 514 during processing. An FPGA utilization vector 516 can maintain the utilization vector and percent utilization of the programmable execution engine 110 of FIG. 2 as an aid during re-configuration.

Figure 6:
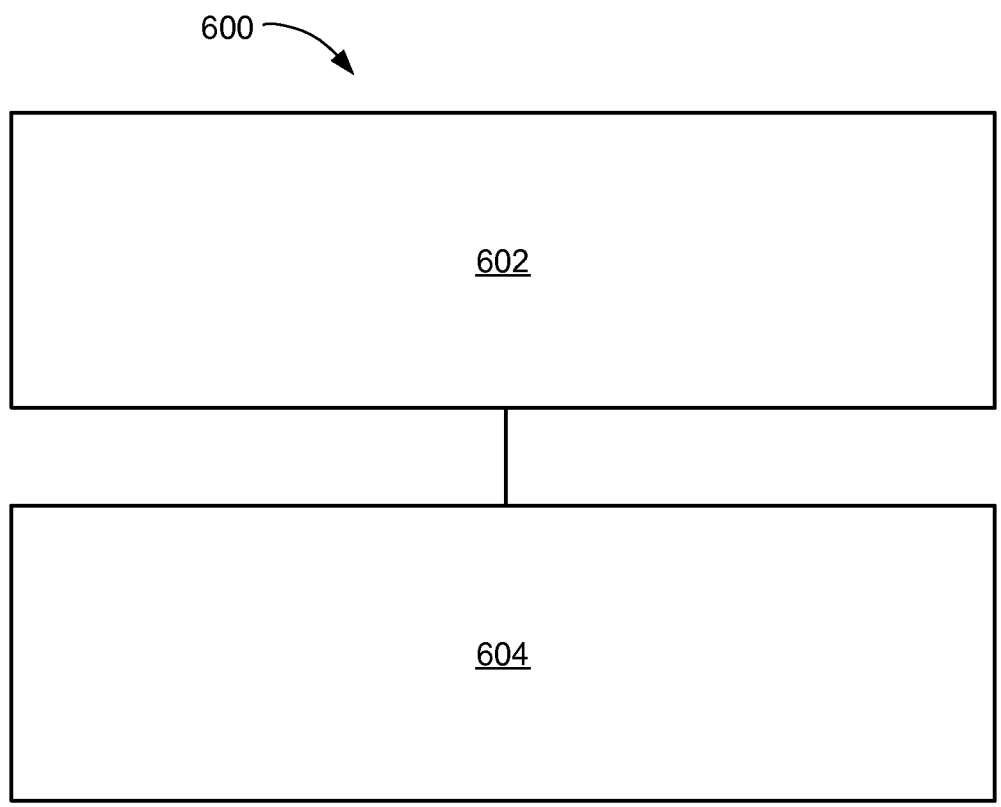
FIG. 6 is a flow chart of a method of operation of a hardware computing system in a further embodiment of the present invention.

Referring now to FIG. 6, therein is shown a flow chart of a method 600 of operation of a hardware computing system in a further embodiment of the present invention. The method 600 includes: generating a command stream by a general purpose central processing unit in a block 602; and receiving, by an application manager, the command stream for executing a command by a programmable execution engine and providing a status through a command execution interface to the general purpose central processing unit for the command from the command stream in a block 604.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a hardware computing system comprising:
   generating a command stream by a general purpose central processing unit; and
   receiving, by an application manager, the command stream for executing a command by a programmable execution engine includes the application manager reconfiguring a field programmable gate array of the programmable execution engine, to execute the command, based on the command stream and providing a status through a command execution interface to the general purpose central processing unit for the command.

2. The method as claimed in claim 1 wherein receiving, by the application manager, the command stream includes:
   monitoring, by a framer, the command in the command stream;
   activating a command control module having a field programmable gate array (FPGA) interface controller; and
   loading an FPGA parallel loader, with the command, by the FPGA interface controller for executing the command.

3. The method as claimed in claim 1 wherein executing the command by the programmable execution engine includes:
   monitoring a memory bus for receiving the command;
   verifying, by a command processor, a configuration of the programmable execution engine; and
   transferring, by a field programmable gate array (FPGA) interface module, input parameters for the command to the programmable execution engine.

4. The method as claimed in claim 1 wherein executing the command by the programmable execution engine includes:
   verifying, by a command interpreter, a configuration of the programmable execution engine; and
   updating an embedded table memory for maintaining usage statistics of the programmable execution engine.

5. The method as claimed in claim 1 further comprising accessing a memory device by the general purpose central processing unit and the application manager for generating the command stream.

6. A method of operation of a hardware computing system comprising:
   transferring a software application through a peripheral controller to a memory device;
   generating a command stream by a general purpose central processing unit including retrieving the command stream from the software application; and
   receiving, by an application manager, the command stream for executing a command by a programmable execution engine includes the application manager reconfiguring a field programmable gate array of the programmable execution engine, to execute the command, based on the command stream and providing a status through a command execution interface to the general purpose central processing unit for the command including storing a result in the memory device.

7. The method as claimed in claim 6 wherein receiving, by the application manager, the command stream includes:
   monitoring, by a framer, the command in the command stream;
   activating a command control module having a field programmable gate array (FPGA) interface controller; and
   loading an FPGA parallel loader, with the command, by the FPGA interface controller for executing the command.

8. The method as claimed in claim 6 wherein executing the command by the programmable execution engine includes:
   monitoring a memory bus for receiving the command of the software application;
   verifying, by a command processor, a configuration of the programmable execution engine; and
   transferring, by a field programmable gate array (FPGA) interface module, input parameters for the command from the memory bus to the programmable execution engine.

9. The method as claimed in claim 6 wherein executing the command by the programmable execution engine includes:
   verifying, by a command interpreter, a configuration of the programmable execution engine;
   transferring input parameters through a bi-directional selector; and
   updating an embedded table memory for maintaining usage statistics of the programmable execution engine.

10. The method as claimed in claim 6 wherein receiving, by the application manager, the command stream includes:

accessing a configuration memory by an embedded memory controller for determining the configuration options of the programmable execution engine;

programming, by a field programmable gate array interface module, the programmable execution engine; and providing, by a command processor, input parameters of the command transferred from the command stream to the programmable execution engine.

11. A hardware computing system comprising:

a memory device having a software application loaded therein;

a general purpose central processing unit coupled to the memory device for generating a command stream by reading a command of the software application; and an application manager, having a programmable execution engine, coupled to the memory device and the general purpose central processing unit includes the programmable execution engine executes the command includes the application manager reconfigures a field programmable gate array of the programmable execution engine, to execute the command, based on the command stream and a command execution interface provides status to the general purpose central processing unit for the command.

12. The system as claimed in claim 11 wherein the programmable execution engine executes the command includes:

a framer loads the command from the command stream;

a command control module, having a field programmable gate array (FPGA) interface controller, coupled to the framer; and an FPGA parallel loader coupled to the field programmable gate array (FPGA) interface controller for loading the command in the programmable execution engine.

13. The system as claimed in claim 11 wherein the programmable execution engine executes the command includes:

a memory bus coupled to the application manager for detecting the command;

a command processor, in the application manager verified a configuration of the programmable execution engine; and a field programmable gate array (FPGA) interface module, coupled to the command processor loads input parameters for the command to the programmable execution engine.

14. The system as claimed in claim 11 wherein the programmable execution engine executes the command includes:

a command interpreter, in the application manager, verified a configuration of the programmable execution engine; and an embedded table memory coupled to the command interpreter for maintaining usage statistics of the programmable execution engine.

15. The system as claimed in claim 11 further comprising a memory device coupled to the general purpose central processing unit and the application manager for generating the command stream.

16. The system as claimed in claim 11 further comprising:

a peripheral controller coupled to the general purpose central processing unit and the application manager for loading a software application in the memory device.

17. The system as claimed in claim 16 wherein the programmable execution engine executes the command includes:

a framer, in the application manager, extracted the command from the command stream;

a command control module having a field programmable gate array (FPGA) interface controller coupled to the framer; and an FPGA parallel loader, loaded with the command, by the FPGA interface controller for executing the command.

18. The system as claimed in claim 16 wherein the programmable execution engine executes the command includes:

a memory bus coupled to the application manager for detecting the command from the command stream;

a command processor, in the application manager verified a configuration of the programmable execution engine includes an embedded table memory read by a command processing unit; and a field programmable gate array (FPGA) interface module, coupled to the command processor loads input parameters for the command to the programmable execution engine.

19. The system as claimed in claim 16 wherein the programmable execution engine executes the command includes:

a command interpreter, in the application manager, verified a configuration of the programmable execution engine;

a bi-directional selector coupled to the programmable execution engine; and an embedded table memory coupled to the command interpreter for maintaining usage statistics of the programmable execution engine.

20. The system as claimed in claim 16 wherein the application manager intercepted the command stream includes:

a configuration memory accessed by an embedded memory controller for determining the configuration options of the programmable execution engine;

a field programmable gate array interface module, programmed the programmable execution engine; and a command processor, transferred input parameters of the command from the command stream to the programmable execution engine.

* * * * *